US009050975B2

(12) United States Patent
Fushiki et al.

(10) Patent No.: US 9,050,975 B2
(45) Date of Patent: Jun. 9, 2015

(54) VEHICLE AND METHOD OF CONTROLLING VEHICLE

(75) Inventors: Shunsuke Fushiki, Susono (JP); Makoto Yamazaki, Gotenba (JP)

(73) Assignee: Toyota Jidosha Kabushiki Kaisha, Toyota (JP)

(*) Notice: Subject to any disclaimer, the term of this patent is extended or adjusted under 35 U.S.C. 154(b) by 0 days.

(21) Appl. No.: 13/996,190

(22) PCT Filed: Jan. 27, 2011

(86) PCT No.: PCT/JP2011/051558
§ 371 (c)(1),
(2), (4) Date: Jun. 20, 2013

(87) PCT Pub. No.: WO2012/101797
PCT Pub. Date: Aug. 2, 2012

(65) Prior Publication Data
US 2013/0297137 A1    Nov. 7, 2013

(51) Int. Cl.
*B60W 20/00* (2006.01)
*B60K 6/445* (2007.10)
*B60W 10/06* (2006.01)
*B60W 10/08* (2006.01)
*B60W 50/02* (2012.01)

(52) U.S. Cl.
CPC .............. *B60W 20/50* (2013.01); *B60K 6/445* (2013.01); *B60W 10/06* (2013.01); *B60W 10/08* (2013.01); *B60W 20/00* (2013.01); *B60W 20/40* (2013.01); *B60W 50/0205* (2013.01); *Y02T 10/6286* (2013.01); *Y10S 903/903* (2013.01); *Y02T 10/6239* (2013.01)

(58) Field of Classification Search
USPC ............ 701/22, 83, 84, 70, 490; 123/339.16, 123/205, 41.05, 406.11–406.18, 690, 123/568.16; 903/930; 180/65.1–65.8, 180/65.21; 340/995.1, 995.19
See application file for complete search history.

(56) References Cited

U.S. PATENT DOCUMENTS

| 7,631,710 | B2 * | 12/2009 | Utsumi ...................... 180/65.21 |
| 8,165,739 | B2 * | 4/2012 | Matsumoto ...................... 701/22 |
| 8,229,616 | B2 * | 7/2012 | Aridome et al. ................. 701/22 |
| 8,346,424 | B2 * | 1/2013 | Zettel et al. ...................... 701/22 |
| 2009/0058326 | A1 * | 3/2009 | Oyobe et al. ...................... 318/53 |
| 2011/0231084 | A1 * | 9/2011 | Nagakura et al. ............. 701/111 |
| 2012/0016547 | A1 * | 1/2012 | Aridome et al. ................. 701/22 |
| 2012/0041630 | A1 | 2/2012 | Yamamoto et al. |

FOREIGN PATENT DOCUMENTS

| JP | A-2010-52610 | 3/2010 |
| WO | WO2010/100736 | * 9/2010 |
| WO | WO 2010/125628 A1 | 11/2010 |

* cited by examiner

*Primary Examiner* — John R Olszewski
*Assistant Examiner* — James M McPherson
(74) *Attorney, Agent, or Firm* — Oliff PLC

(57) ABSTRACT

A vehicle includes an engine, a power storage device, a motor generator using electric power from the power storage device for generating driving force, and an ECU. The vehicle is capable of running with the operation mode selectively switched between the CS mode in which the vehicle runs utilizing the driving force from the engine and the motor generator, and the CD mode in which the vehicle runs preferentially utilizing the driving force from the motor generator in the state where the engine is stopped. When the OBD is performed for detecting a malfunction in the engine in the state where the CD mode is selected, the ECU keeps the operation mode being temporarily switched from the CD mode to the CS mode until the OBD is completed.

5 Claims, 6 Drawing Sheets

VEHICLE AND METHOD OF CONTROLLING VEHICLE

TECHNICAL FIELD

The present invention relates to a vehicle and a method of controlling the vehicle, and more particularly to malfunction detection control for an internal combustion engine in a hybrid vehicle.

BACKGROUND ART

In recent years, attention has been given to a hybrid vehicle as an environmentally-friendly vehicle which runs utilizing the driving force generated by an internal combustion engine representative of an engine and the driving force from a rotating electric machine driven with the electric power stored in a vehicle-mounted power storage device (for example, a secondary battery, a capacitor and the like).

Also known is a self-diagnosis function (also hereinafter referred to as an OBD "On Board Diagnosis") that can automatically detect malfunctions in the engine during driving of the engine, thereby allowing the user to readily grasp the causes and the like of failures. In a hybrid vehicle, the engine is stopped when the vehicle runs only with the driving force from the rotating electric machine or when the vehicle is not running. Accordingly, it is conceivable that the frequency of performing malfunction detection by this OBD is decreased as compared with the vehicle driven only by the engine.

Japanese Patent Laying-Open No. 2010-052610 (PTL 1) discloses the configuration in which the engine state during the previous engine operation is stored, and when it is highly likely that a malfunction has occurred in the engine, the engine start determination value is lowered. According to the configuration disclosed in Japanese Patent Laying-Open No. 2010-052610 (PTL 1), when it is highly likely that a malfunction has occurred in the engine in light of the stored engine state during the previous engine operation, the engine can be started at an earlier stage than usual. Accordingly, it can be detected at an early stage whether the engine malfunction continues or not, and also, the user can be notified of the malfunction of the engine.

CITATION LIST

Patent Literature

PTL 1: Japanese Patent Laying-Open No. 2010-052610

SUMMARY OF INVENTION

Technical Problem

The hybrid vehicle may have a configuration that allows selective switching between the first mode in which the vehicle runs utilizing at least the driving force from the rotating electric machine among the engine output and the driving force from the rotating electric machine, and the second mode in which the vehicle runs using only the driving force from the rotating electric machine in the state where the engine is stopped.

In recent years and also in the future, it is predicted that the frequency of selecting the above-described second mode is increased in order to restrict driving of the engine wherever possible to reduce discharge of $CO_2$, NOx, SOx, and the like.

In this case, opportunities to drive the engine may be further reduced. This leads to a decrease in frequency of the malfunction detection performed by OBD. Consequently, there may be a possibility that the engine cannot be driven due to malfunctions when driving of the engine is required.

The present invention has been made to solve the above-described problems. An object of the present invention is to provide a hybrid vehicle capable of selectively switching between the first mode in which the vehicle runs utilizing at least the driving force from the rotating electric machine among the engine output and the driving force from the rotating electric machine, and the second mode in which the vehicle runs utilizing only the driving force from the rotating electric machine in the state where the engine is stopped, wherein this hybrid vehicle is configured such that malfunction detection for the engine by the OBD can be readily performed even when the second mode is selected.

Solution to Problem

A vehicle according to the present invention includes an internal combustion engine, a power storage device, a rotating electric machine for generating driving force using electric power from the power storage device, and a control device for detecting a malfunction in the internal combustion engine. The vehicle has, as an operation mode, a first mode in which the vehicle runs utilizing at least the driving force from the rotating electric machine among an output of the internal combustion engine and the driving force from the rotating electric machine, and a second mode in which the vehicle runs preferentially utilizing the driving force from the rotating electric machine in a state where the internal combustion engine is stopped, and the internal combustion engine is less frequently driven as compared with the first mode. The vehicle is capable of running with the operation mode selectively switched. When a malfunction detection process for the internal combustion engine is performed in a case where the second mode is selected, the control device allows the internal combustion engine to be more frequently driven as compared with a case where the malfunction detection process is not performed.

Preferably, when malfunction detection for the internal combustion engine is performed in a state where the second mode is selected, the control device switches the operation mode to the first mode.

Preferably, when malfunction detection for the internal combustion engine is performed in the state where the second mode is selected, the control device keeps the operation mode being switched to the first mode until the malfunction detection process is completed.

Preferably, in a case where there is a history that a malfunction in the internal combustion engine is detected in the malfunction detection process during previous running and where the second mode is selected during current running, the control device switches the operation mode to the first mode and performs the malfunction detection process when the internal combustion engine is driven.

Preferably, when the second mode is selected in a case where a state of charge of the power storage device is from a fully charged state to a reference range determined in advance, the control device switches the operation mode to the first mode after the state of charge falls below the reference range, and performs the malfunction detection process when the internal combustion engine is driven.

Preferably, in the case where the second mode is selected, the control device forcibly drives the internal combustion engine in order to perform the malfunction detection process.

Preferably, in the case where the second mode is selected, the control device inhibits the internal combustion engine from being stopped until the malfunction detection process is completed, when the internal combustion engine is driven in the second mode.

A method of controlling a vehicle according to the present invention is a method of controlling a vehicle including an internal combustion engine, a power storage device, and a rotating electric machine for generating driving force using electric power from the power storage device, said vehicle being capable of running with selective switching done between a first mode in which the vehicle runs utilizing at least the driving force from the rotating electric machine among an output of the internal combustion engine and the driving force from the rotating electric machine, and a second mode in which the vehicle runs preferentially utilizing the driving force from the rotating electric machine in a state where the internal combustion engine is stopped, and the internal combustion engine is less frequently driven as compared with the first mode. The method includes the steps of: determining whether the second mode is selected or not; and, when malfunction detection for the internal combustion engine is performed in a case where the second mode is selected, allowing the internal combustion engine to be more frequently driven as compared with a case where malfunction detection is not performed.

Advantageous Effects of Invention

According to the present invention, in the hybrid vehicle capable of selectively switching between the first mode in which the vehicle runs utilizing at least the driving force from the rotating electric machine among the engine output and the driving force from the rotating electric machine, and the second mode in which the vehicle runs utilizing only the driving force from the rotating electric machine in the state where the engine is stopped, detection of malfunctions in the engine by OBD can be readily performed even when the second mode is selected.

DESCRIPTION OF EMBODIMENTS

Figure 1:
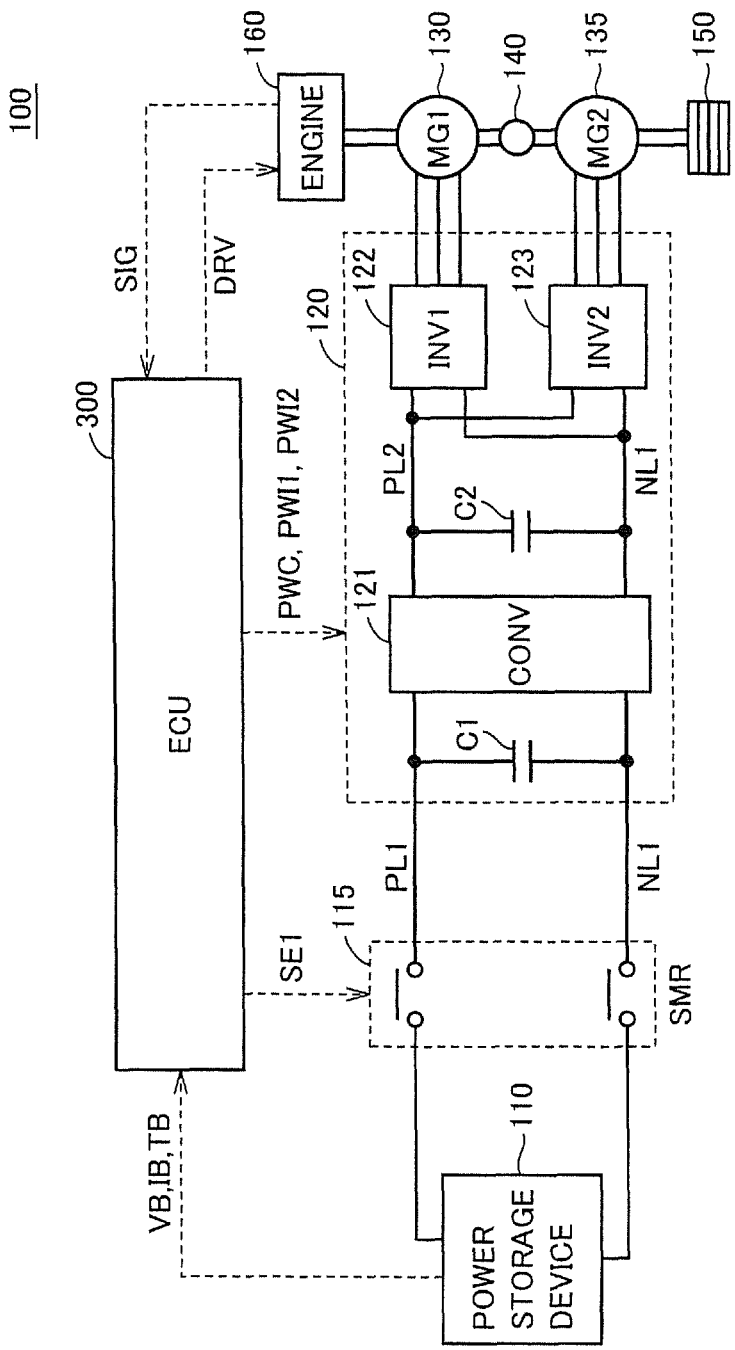
FIG. 1 is an entire block diagram of a vehicle in accordance with the present embodiment.

The embodiments of the present invention will be hereinafter described in detail with reference to the accompanying drawings, in which the same or corresponding components are designated by the same reference characters, and description thereof will not be repeated.

[First Embodiment]

FIG. 1 is an entire block diagram of a vehicle 100 in accordance with the present embodiment. Referring to FIG. 1, vehicle 100 includes a power storage device 110, a system main relay (hereinafter also referred to as an SMR (System Main Relay) 115, a PCU (Power Control Unit) 120 serving as a drive device, motor generators 130, 135, a power transmission gear 140, a driving wheel 150, an engine 160, and a control device (hereinafter also referred to as an ECU (Electronic Control Unit)) 300.

Power storage device 110 is a chargeable and dischargeable electric power storage element. Power storage device 110 is configured to include, for example, a secondary battery such as a lithium-ion battery, a nickel-metal hydride battery or a lead acid battery, or a cell of a power storage element such as an electric double layer capacitor.

Power storage device 110 is connected through SMR 115 to PCU 120 for driving motor generators 130 and 135. Power storage device 110 supplies the electric power for generating the driving force for vehicle 100 to PCU 120. Furthermore, power storage device 110 stores the electric power generated by motor generators 130 and 135. The output power of power storage device 110 is, for example, 200V.

The relay included in SMR 115 has one end connected to each of the positive and negative electrode terminals of power storage device 110. The relay included in SMR 115 has the other end connected to each of a power line PL1 and a ground line NL1 which are connected to PCU 120. Based on a control signal SE1 from ECU 300, SMR 115 switches between supply and interruption of the electric power between power storage device 110 and PCU 120. SMR 115 is closed when a Ready signal defined by the user's operation of an ignition switch is set to be ON.

PCU 120 includes a converter 121, inverters 122, 123, and capacitors C1, C2.

Based on a control signal PWC from ECU 300, converter 121 performs voltage conversion between power line PL1 and ground line NL1, and power line PL2 and ground line NL1.

Inverters 122 and 123 are connected in parallel to power line PL2 and ground line NL1. Based on control signals PWI1 and PWI2 from ECU 300, inverters 122 and 123 convert a direct-current (DC) power supplied from converter 121 into an alternating-current (AC) power, to drive motor generators 130 and 135, respectively.

Capacitor C1 is provided between power line PL1 and ground line NL1, and reduces the voltage variation between power line PL1 and ground line NL1. Capacitor C2 is also provided between power line PL2 and ground line NL1, and reduces the voltage variation between power line PL2 and ground line NL1.

Motor generators 130 and 135 each are an AC rotating electric machine, and, for example, a permanent magnet type synchronous electric motor provided with a rotor into which a permanent magnet is incorporated.

The output torque of each of motor generators 130 and 135 is transmitted to driving wheel 150 through power transmission gear 140 formed by a reduction gear and a power split device, for driving vehicle 100. Motor generators 130 and 135 can generate electric power by the rotating force of driving wheel 150 during the regenerative braking operation of vehicle 100. PCU 120 then converts the generated electric power into charge power for power storage device 110. In the present embodiment, motor generator 130 is configured so as to operate exclusively as a power generator driven by engine 160 for generating electric power while motor generator 135 is configured so as to operate exclusively as an electric motor for driving driving wheel 150 to drive vehicle 100.

Motor generator 130 is also connected to engine 160 through power transmission gear 140. When vehicle 100 is in the CS (Charge Sustaining) mode for the HV (Hybrid Vehicle) running in which the vehicle runs utilizing the driving force from motor generator 130 and engine 160 while maintaining the SOC at a prescribed value, ECU 300 appropriately adjusts the proportion between the driving force from motor generator 130 and the driving force from engine 160, so that vehicle 100 runs using the combined driving force. It is also possible to select the CD (Charge Depleting) mode in which a high priority is given to the EV (Electric Vehicle) running in which the vehicle runs only with the driving force from motor generator 130. Based on a selection signal SEL in accordance with the user's operation, ECU 300 switches between the above-described CS mode and CD mode.

It is to be noted that the engine is not limited to the configuration as described above for generating the driving force for vehicle running. For example, the present embodiment can also be applied to the vehicle in the so-called range extender system by which the engine is driven to drive the motor generator for power generation and the driving force for running is generated exclusively by the motor generator.

Furthermore, although the present embodiment shows an example of the configuration in which the number of pairs of a motor generator and an inverters is two, the number of pairs of a motor generator and an inverter may be one, or more than two.

ECU 300 including a CPU (Central Processing Unit), a storage device and an input and output buffer which are not shown in FIG. 1 receives a signal from each sensor and the like and outputs a control signal to each device. ECU 300 also controls vehicle 100 and each device. It is to be noted that the above-described control is not limited to the process by software but can be carried out by dedicated hardware (an electronic circuit).

ECU 300 receives detection values of a voltage VB, a current IB and a temperature TB of power storage device 110 from the voltage sensor, the current sensor and the temperature sensor, respectively, which are included in power storage device 110 but not shown in the figure. ECU 300 calculates the SOC (State of Charge) of power storage device 110 based on these pieces of information.

Based on the SOC of power storage device 110, the request torque in accordance with the user's operation and the like, ECU 300 outputs, to engine 160, a drive command DRV for driving engines 160, for example, such as the injection amount and timing of the fuel, the valve opening and closing timings, and the ignition timing.

Furthermore, ECU 300 receives a signal SIG showing the drive state of each part in engine 160 while engine 160 is being driven. ECU 300 executes the OBD for automatically detecting based on this signal SIG whether or not a malfunction occurs in engine 160.

In addition, although FIG. 1 shows ECU 300 as one control device, ECU 300 may be configured to have a control device for each device or for each function.

As described above, in the hybrid vehicle capable of switching between the CD mode and the CS mode, when the CD mode is selected, the engine is hardly driven except for the case where the engine needs to be driven as in the case where continuation of the EV running becomes difficult due to decrease in the SOC of the power storage device and an abrupt acceleration torque is required. Accordingly, in the case where the vehicle runs mainly only a short distance, for example, for commuting and daily shopping, such a situation may occur that the engine is not driven for a long period of time.

On the other hand, various vehicles may be provided with OBD for automatically performing a self-diagnosis of malfunctions in the engine. Essentially, this OBD often cannot allow detection of malfunctions unless the engine is being driven. Accordingly, as described above, when the state where the engine is not driven continues for a relatively long period of time due to use of the CD mode, the malfunctions occurring in the engine during this period of time are not detected. Consequently, the engine may not be able to be appropriately started when trying to drive the engine. Alternatively, even if the engine can be started, emissions are degraded, which may cause an adverse effect on the environment.

Thus, according to the first embodiment, in the OBD during the previous running, in the case where the CD mode is selected when it is determined that a malfunction occurs in the engine, the mode is forcibly switched to the CS mode temporarily to thereby increase the frequency of starting the engine, so that OBD execution control is implemented to allow the OBD to be readily performed.

In this way, malfunctions occurring in the engine can be detected at a relatively early stage even when the CD mode is frequently used.

Figure 2:
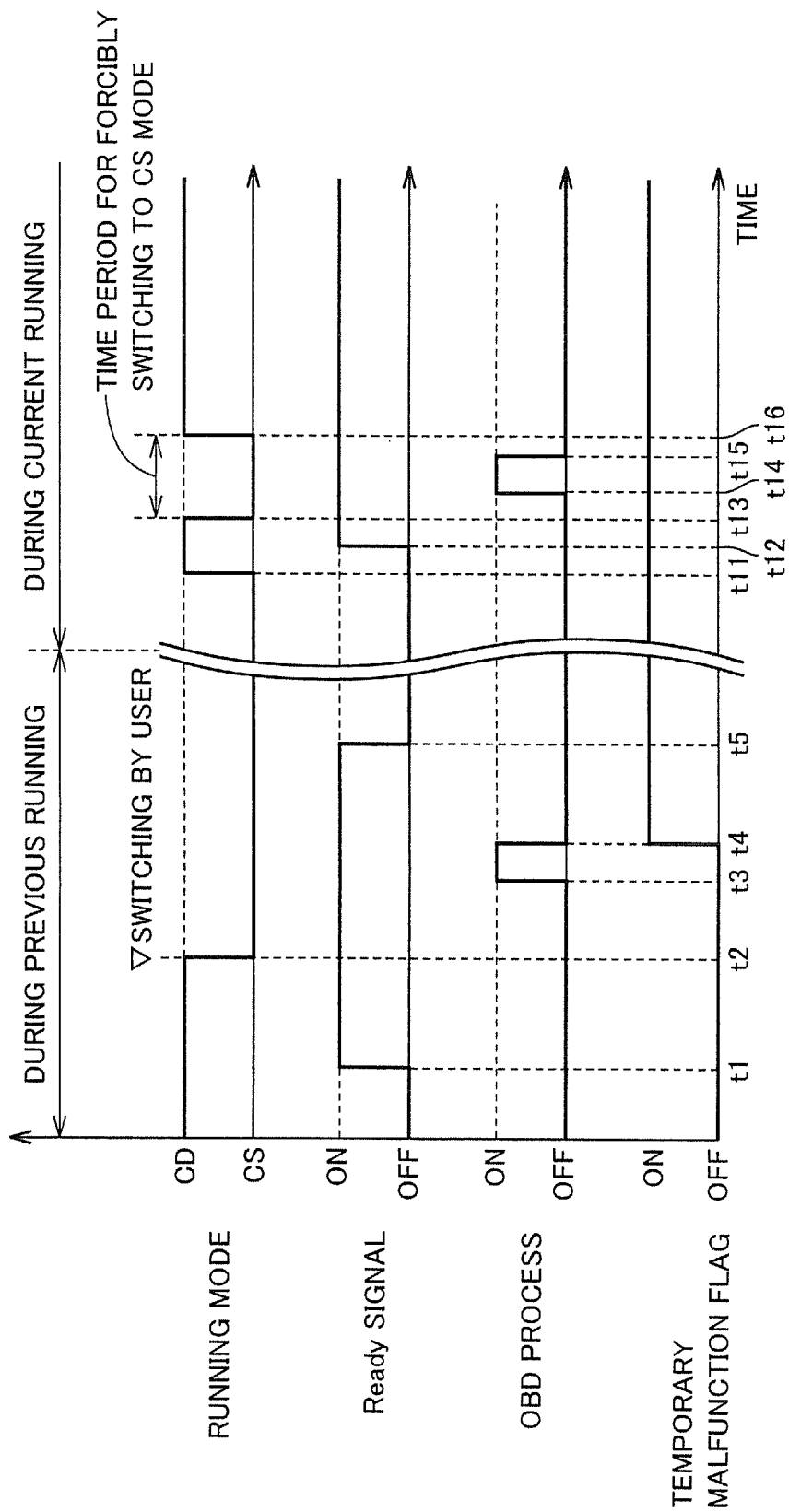
FIG. 2 is a time chart for illustrating the outline of the OBD execution control in the first embodiment.

FIG. 2 is a time chart for illustrating the outline of the OBD execution control in the first embodiment. In FIG. 2, the horizontal axis shows time while the vertical axis shows the state of the running mode, the state of the Ready signal, the OBD execution state, and the state of a temporary malfunction flag of engine 160. In FIG. 2, each operation corresponding to times t1 to t5 shows the state during the previous running while each operation at a time 11 and after thereof shows the state during the current running.

Referring to FIGS. 1 and 2, at time t1, an ignition switch is operated by the user to turn the Ready signal to be ON. At time t1, since the CD mode is selected as the running mode, the engine is essentially being stopped unless the SOC of power storage device 110 is decreased or large output power is required due to sudden acceleration and the like. Accordingly, the OBD is not performed. In addition, in the case of the "previous running" in FIG. 2, no malfunction in engine 160 is detected during running previous thereto, in which case the temporary malfunction flag remains OFF.

An explanation will be hereinafter made with regard to the case where the running mode is switched to the CS mode by the user at time t2. This switching leads to execution of the HV running in which engine 160 and motor generators 130 and 135 are used. Then, OBD is performed between time t3 and time t4 within the time period during which engine 160 is being driven.

In this case, when a malfunction fatal to driving of engine 160 occurs, engine 160 should be immediately stopped. However, in the case where the malfunction is not fatal to running of the vehicle, for example, such as slight degradation of emissions, the temporary malfunction flag is set to be ON and the engine is continuously driven without immediately stopping engine 160. In this case, when a similar malfunction is again detected in the next OBD, the user is notified of this malfunction as a true malfunction, as will be described later.

Then, at time t5, the Ready signal is turned OFF by the user's ignition switch operation, to end the running operation.

In order to perform the next running operation, at time t11, the CD mode is selected as the running mode and the Ready signal is set to be ON by the ignition switch (time t12). In this case, since the temporary malfunction flag is set during the previous running, the running mode is temporarily switched from the CD mode to the CS mode at time t13.

Then, OBD is performed in the time period during which engine 160 is being driven in the CS mode, to perform malfunction detection (time t14 to time t15). At time t15, upon completion of the OBD, the temporary malfunction flag is set to be OFF. In this case, when the malfunction similar to that occurring during the previous running is again detected, the user is notified of this malfunction occurring as a true malfunction. On the other hand, when no malfunction is detected, no notification is given to the user. Furthermore, in the case where the malfunction similar to that occurring during the previous running is not detected but a different malfunction is detected, the temporary malfunction flag is again set to be ON.

Then, in accordance with completion of the OBD, the running mode is again switched back to the CD mode (time t16).

Figure 3:
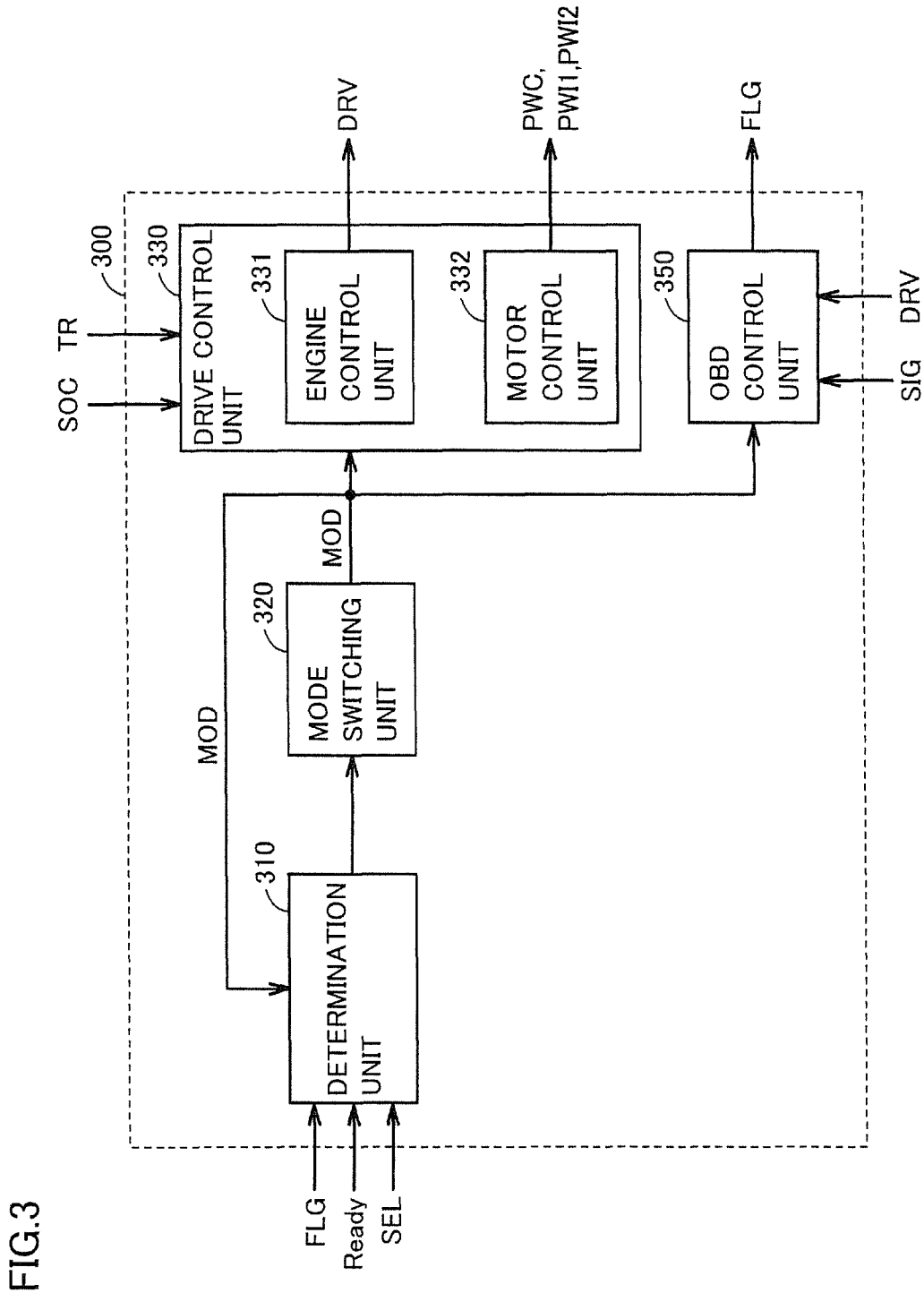
FIG. 3 is a functional block diagram for illustrating the OBD execution control performed in an ECU in the first embodiment.

FIG. 3 is a functional block diagram for illustrating the OBD execution control performed in ECU 300 in the first embodiment.

Referring to FIG. 3, ECU 300 includes a determination unit 310, a mode switching unit 320, a drive control unit 330, and an OBD control unit 340. Furthermore, drive control unit 330 includes an engine control unit 331 and a motor control unit 332.

Determination unit 310 receives a Ready signal, a selection signal SEL for the running mode by the user, and a temporary malfunction flag FLG showing whether or not a malfunction occurs in engine 160 during previous running. Determination unit 310 also receives a signal MOD showing the running mode selected by mode switching unit 320 which will be described later. Based on these pieces of information, determination unit 310 generates a switching signal DET showing as to whether the CS mode or the CD mode is selected, to output the signal to mode switching unit 320.

In principle, determination unit 310 sets switching signal DET so as to select the running mode in accordance with selection signal SEL set by the user. However, as explained with reference to FIG. 2, when the CD mode is selected in the state where a malfunction in engine 160 is detected in the OBD during the previous running, switching signal DET is generated such that the mode is forcibly switched to the CS mode temporarily. This may facilitate the operation of engine 160 and also facilitate implementation of the OBD.

It is to be noted that determination unit 310 may automatically select the running mode depending on the SOC, the destination registered by the user in the navigation system (not shown) and other various pieces of information, or the combination of thereof.

Mode switching unit 320 receives switching signal DET from determination unit 310. Mode switching unit 320 switches the running mode in accordance with this switching signal DET, and outputs signal MOD showing the running mode to determination unit 310, drive control unit 330 and OBD control unit 340.

Drive control unit 330 receives a torque command value TR determined based on running mode MOD from mode switching unit 320, the SOC of power storage device 110 and the user operation. Based on these pieces of information, drive control unit 330 distributes the request torque to engine 160 and motor generators 130, 135. Then, in accordance with the distributed request torque, engine control unit 331 generates drive command DRV of engine 160 while motor control unit 332 generates control signals PWC, PWI1 and PWI2 for driving PCU 120.

OBD control unit 340 receives running mode MOD from mode switching unit 320, drive command DRV from engine control unit 331, and state signal SIG of engine 160. Based on these pieces of information, OBD control unit 340 performs OBD for detecting whether a malfunction occurs or not in engine 160 during driving of engine 160.

Figure 4:
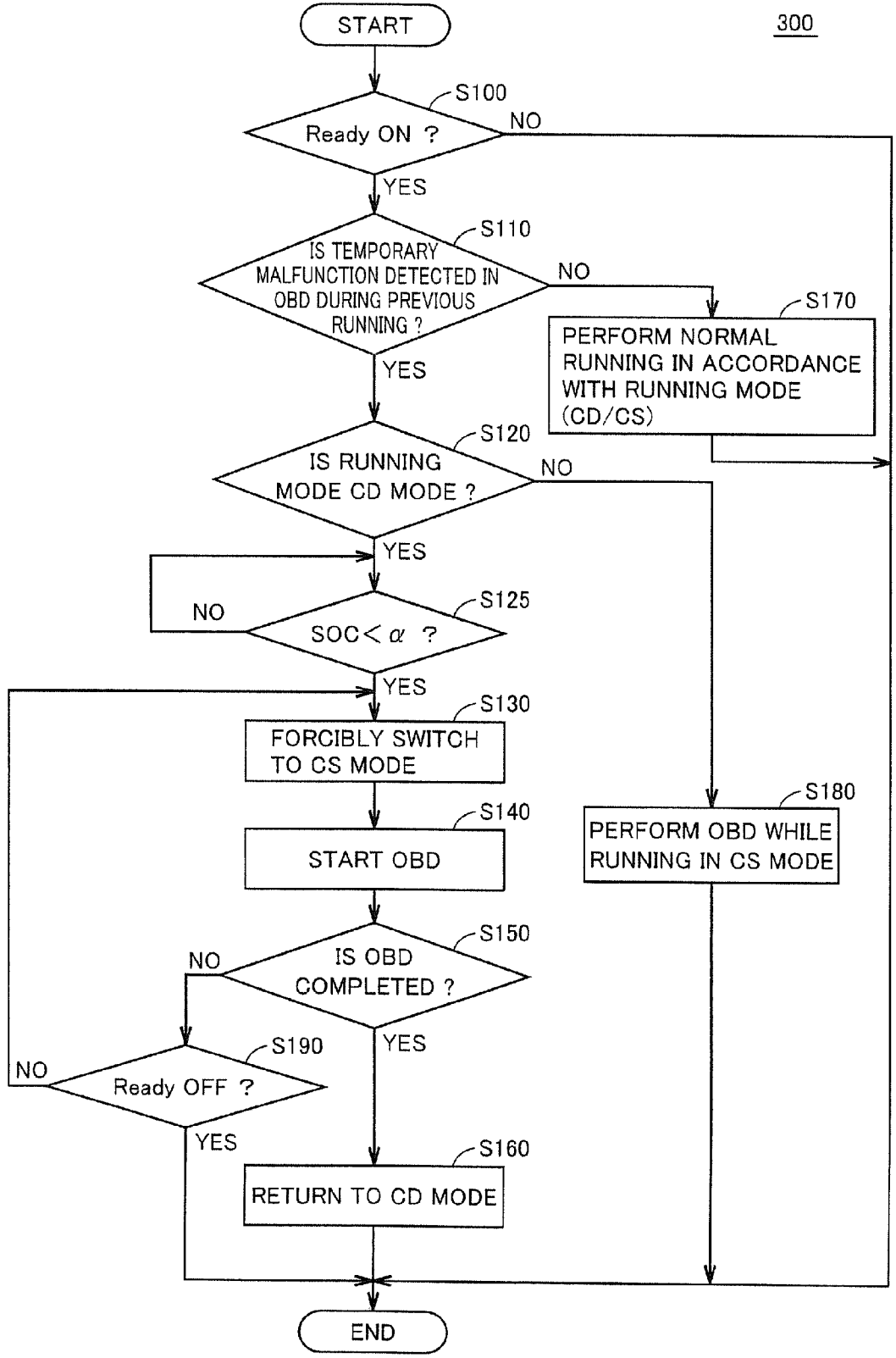
FIG. 4 is a flowchart for illustrating the details of the OBD execution control process performed in the ECU in the first embodiment.
Figure 5:
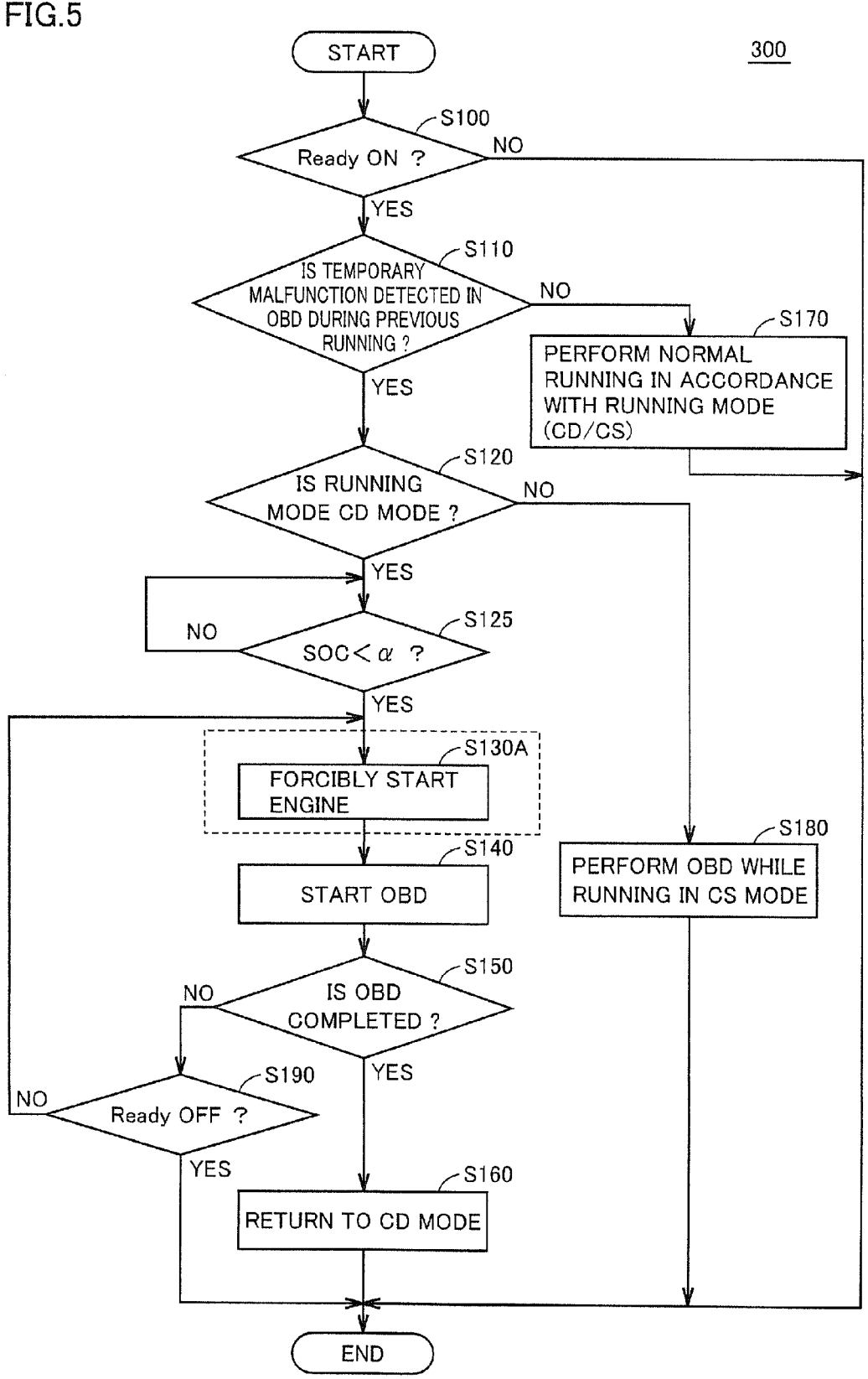
FIG. 5 is a flowchart for illustrating the details of the OBD execution control process performed in the ECU in the second embodiment.
Figure 6:
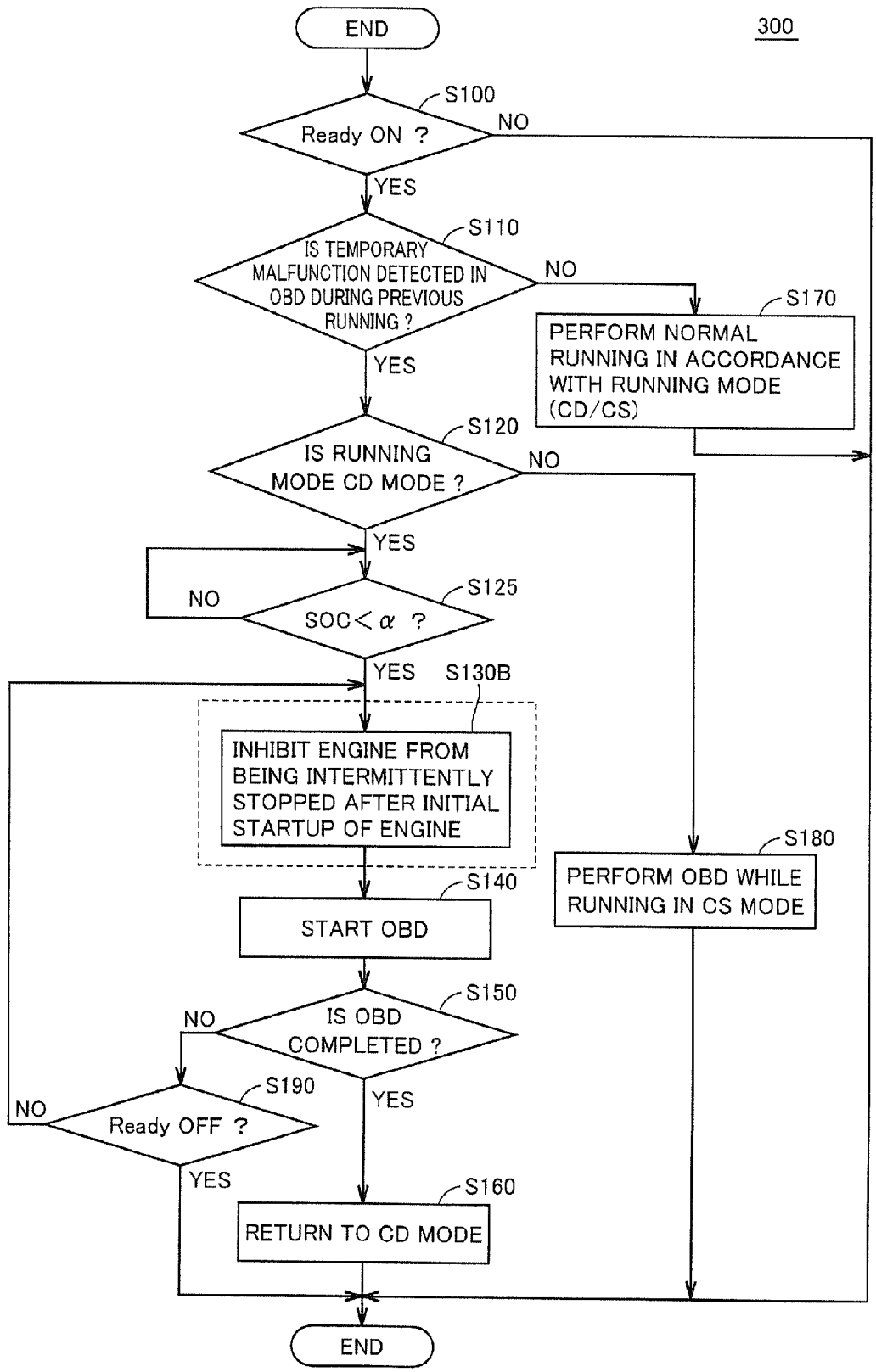
FIG. 6 is a flowchart for illustrating the details of the OBD execution control process performed in the ECU in the third embodiment.

FIG. 4 is a flowchart for illustrating the details of the OBD execution control process performed in ECU 300 in the first embodiment. In the flowcharts of FIG. 4 and FIGS. 5 and 6 which will be described later, the process is implemented by executing the program stored in ECU 300 in advance in predetermined cycles. Alternatively, in some of the steps, the process can also be implemented by constructing dedicated hardware (an electronic circuit).

Referring to FIGS. 1 and 4, ECU 300 determines in step (which will be hereinafter abbreviated as S) 100 whether the Ready signal is ON or not.

When the Ready signal is OFF (NO in S100), vehicle 100 does not run. Therefore, ECU 300 ends the process.

When the Ready signal is ON (YES in S100), the process proceeds to S110, in which ECU 300 determines whether a temporary malfunction in engine 160 has been detected or not in the OBD during the previous running.

When a temporary malfunction has not been detected (NO in S110), the process proceeds to S170, in which ECU 300 causes normal running to be implemented in accordance with the running mode selected by the user. In this case, OBD is performed in the time period during which engine 160 is being driven.

When a temporary malfunction has been detected (YES in S110), the process proceeds to S120, in which ECU 300 determines whether the running mode selected by the user is a CD mode or not.

When the running mode is a CS mode (NO in S120), the process proceeds to S180, in which, while running in the CS mode, ECU 300 executes the OBD in the time period during which engine 160 is being driven.

When the running mode is a CD mode (YES in S120), ECU 300 determines in S125 whether the SOC is smaller than a prescribed threshold value α. This determination is carried out in order to prevent an overvoltage from occurring in power storage device 110 due to the electric power generation by motor generator 130 that is caused by driving engine 160 when power storage device 110 is in the nearly fully-charged state.

When the SOC is equal to or greater than prescribed threshold value α (NO in S125), the process is returned to S125, in which ECU 300 causes the electric power to be consumed by EV running until the SOC is decreased to the prescribed level.

When the SOC is smaller than threshold value α (YES in S125), the process proceeds to S130, in which ECU 300 temporarily switches the running mode from the CD mode to the CS mode in order to perform diagnosis of malfunctions in engine 160 at an early stage. In S140, if engine 160 is being driven while running in the CS mode, ECU 300 performs OBD during this time period. In addition, although the CS mode executed in S130 may be controlled in a similar manner to that in the CS mode in the normal case, the conditions may be partially changed, for example, such that the value at which the SOC is maintained is set at the SOC at the time when the mode is switched in S130.

Then, the process proceeds to step S150, in which ECU 300 determines whether the OBD is completed or not.

When the OBD is completed (YES in S150), the process proceeds to S160, in which ECU 300 returns the running mode to the CD mode for continuing running. Although not shown in FIG. 4, when a malfunction in engine 160 is detected by the OBD, the user is notified by a display device and the like of occurrence of the malfunction as a true malfunction.

In addition, depending on the manner of the malfunction detected by OBD and other specific conditions for the vehicle, the mode may not be returned to the CD mode in S160. For example, immediately after the fuel supply, the vaporized gas of the fuel tends to be adsorbed within a canister, which may lead to deterioration in leakage detection of the vaporized gas. For that reason, the CS mode may be continued for a certain period of time immediately after the fuel supply.

When the OBD is not completed (NO in S150), the process then proceeds to S190, in which ECU 300 determines whether the Ready signal is turned OFF or not.

When the Ready signal remains ON (NO in S190), the vehicle continues running. Accordingly, the process is returned to S130 in which it is waited until the OBD is completed in the state where the running mode remains switched to the CS mode.

The fact that the Ready signal is turned OFF (YES in S190) means that the running ends. Since the OBD is not completed, ECU 300 ends the process in the state where temporary malfunction flag FLG of engine 160 is stored.

By performing the control in accordance with the above-described process, in the hybrid vehicle capable of selectively switching between the CS mode and the CD mode, it becomes possible to perform malfunction detection for the engine by the OBD to thereby allow execution of engine malfunction detection at an early stage, even when the CD mode is selected. Furthermore, the running mode is switched to the CS mode, which results in the state where the conditions for starting the engine in consideration of fuel consumption and the like are maintained. Consequently, deterioration in fuel efficiency can be suppressed, for example, as compared to the method of changing the engine start determination value.

[Second Embodiment]

An explanation has been made in the first embodiment with regard to the configuration in which, when the CD mode is selected as the running mode in the case where a temporary malfunction in the engine is detected, the running mode is temporarily switched from the CD mode to the CS mode until execution of the OBD is completed.

However, also in the CS mode, when the SOC of the power storage device is relatively high, the engine is driven less frequently. Accordingly, there may be a case where the OBD cannot be performed.

Thus, an explanation will be made in the second embodiment with regard to the configuration in which, in the case where a temporary malfunction in the engine is detected and when the CD mode is selected as the running mode, the engine is forcibly started to perform OBD at a further earlier stage. Such a configuration is effective in the case where it is desirable to determine as early as possible whether the malfunction in the engine continues or not that has been detected by the above-described OBD and is regarded as a relatively significant malfunction.

FIG. 5 is a flowchart for illustrating the details of the OBD execution control process performed in ECU 300 in the second embodiment. FIG. 5 shows the same flowchart as that in FIG. 4 described in the first embodiment except that step S130 is replaced with step S130A. The same steps as those in FIG. 4 will not be repeated in FIG. 5.

Referring to FIGS. 1 and 5, when the Ready signal is ON (YES in S100), a temporary malfunction is detected by the OBD during the previous running (YES in S110), the CD mode is selected as the current running mode (YES in S120), and further, the SOC of power storage device 110 falls below prescribed threshold value α (YES in S125), the process proceeds to S130A, in which ECU 300 forcibly starts engine 160 in the state where the running mode is maintained in the CD mode.

Since engine 160 is being driven, ECU 300 then performs OBD in S140.

Then, when the OBD is completed (YES in S150), ECU 300 stops engine 160 and causes the vehicle to continue running in the normal CD mode (S160).

On the other hand, in the case where the OBD is not completed (NO in S150) and when the Ready signal is ON while the running continues (NO in S190), the process is returned to S130A and the OBD is continued. When the Ready signal is turned OFF and the running ends (YES in S190), ECU 300 ends the process.

By performing the control in accordance with the above-described process, the OBD can be executed more reliably while malfunction detection for the engine can be performed at an early stage.

[Third Embodiment]

In the case where the malfunction in the engine detected during the previous running is relatively minor so that the running and emissions are extremely less influenced, startup of the engine at an early stage as in the first and second embodiments may lead to deterioration in fuel efficiency by contraries.

In such a case, it is desirable that, while giving priority to the state where the engine is not driven wherever possible by the CD mode, OBD is reliably executed when driving of the engine is required in accordance with reduction in the SOC.

Then, an explanation will be given in the third embodiment with regard to the configuration in which driving of the engine is continued until the OBD is completed when driving of the engine is required in the state where a temporary malfunction in the engine is detected and in the case where the CD mode is selected as the running mode.

FIG. 6 is a flowchart for illustrating the details of the OBD execution control process performed in ECU 300 in the third embodiment. FIG. 6 shows the same flowchart as that in FIG. 4 described in the first embodiment except that step S130 is replaced with step S130B. The same steps as those in FIG. 4 will not be repeated in FIG. 6.

Referring to FIGS. 1 and 6, the Ready signal is ON (YES in S100), a temporary malfunction is detected by the OBD during the previous running (YES in S110), the CD mode is selected as the current running mode (YES in S120), and further, the SOC of power storage device 110 falls below prescribed threshold value α (YES in S125), the process proceeds to S130B. Then, ECU 300 performs setting such that the engine is inhibited from being intermittently stopped at initial startup of the engine.

Then, ECU 300 proceeds the process to S140 and performs the OBD when engine 160 is driven.

By such an approach, once the engine is started while improving the fuel efficiency by preferentially executing the EV running in the CD mode, the OBD can be reliably performed unless the vehicle running is ended (Ready signal is turned OFF).

In addition, although an explanation has been given in the above description with regard to the configuration in which the first to third embodiments are separately implemented, the configuration obtained by combining these configurations as appropriate may also be applied. For example, any of the above-described first to third embodiments may be selected in accordance with the manner of malfunctions in the engine determined by the OBD during the previous running.

It should be understood that the embodiments disclosed herein are illustrative and non-restrictive in every respect. The scope of the present invention is defined by the terms of the claims, rather than the description above, and is intended to include any modifications within the scope and meaning equivalent to the terms of the claims.

REFERENCE SIGNS LIST 100 vehicle, 110 power storage device, 115 SMR, 120 PCU, 121 converter, 122, 123 inverter, 130, 135 motor generator, 140 power transmission gear, 150 driving wheel, 160 engine, 300 ECU, 310 determination unit, 320 mode switching unit, 330 drive control unit, 331 engine control unit, 332 motor control unit, 340 OBD control unit, C1, C2 capacitor, NL1 ground line, PL1, PL2 power line.

The invention claimed is:

1. A vehicle comprising:
   an internal combustion engine;
   a power storage device configured to store electric power;
   a rotating electric machine configured to generate a driving force using the electric power from said power storage device; and
   a control device configured to detect a malfunction in said internal combustion engine,
   said vehicle having, as an operation mode: a CS (Charge Sustaining) mode and a CD (Charge Depleting) mode, said vehicle being configured to run with said operation mode selectively switched between the CS mode and the CD mode, each of said CS mode and CD mode having a state where said internal combustion engine is operated and a state where said internal combustion engine is not operated, and
   in response to: (i) detecting a malfunction in said internal combustion engine during past operation of the vehicle, and (ii) said operation mode being said CD mode during present operation of the vehicle, said control device switches said operation mode to said CS mode and performs a malfunction detection process when said internal combustion engine is operated.

2. The vehicle according to claim 1, wherein, when malfunction detection for said internal combustion engine is performed in a state where said CD mode is selected, said control device switches said operation mode to said CS mode.

3. The vehicle according to claim 2, wherein, when said operation mode is switched to said CS mode such that said malfunction detection for said internal combustion engine is performed in the state where said CD mode is selected, said control device maintains said CS mode during said malfunction detection process.

4. The vehicle according to claim 1, wherein, in the case where said CD mode is selected, said control device inhibits said internal combustion engine from being stopped until said malfunction detection process is completed, when said internal combustion engine is driven in said CD mode.

5. A method of controlling a vehicle, said vehicle including an internal combustion engine, a power storage device configured to store electric power, and a rotating electric machine configured to generate a driving force using the electric power generated from said power storage device, said vehicle being configured to run with selective switching performed between: (1) a CS (Charge Sustaining) mode, and (2) a CD (Charge Depletion) mode, each of said CS mode and CD mode having a state where said internal combustion engine is operated and a state where said internal combustion engine is not operated, said method comprising the steps of:
   determining whether a malfunction in said internal combustion engine has been detected in a malfunction detection process during past operation of the vehicle; and
   in response to: (i) determining that a malfunction has occurred in said internal combustion engine during past operation of the vehicle, and (ii) said CD mode being selected during present operation of the vehicle, said control device switches said operation mode to said CS mode and performs said malfunction detection process when said internal combustion engine is operated.

* * * * *